F. SCHULER.
HOLDER FOR COOKING VESSELS.
APPLICATION FILED NOV. 8, 1909.
980,130.
Patented Dec. 27, 1910.
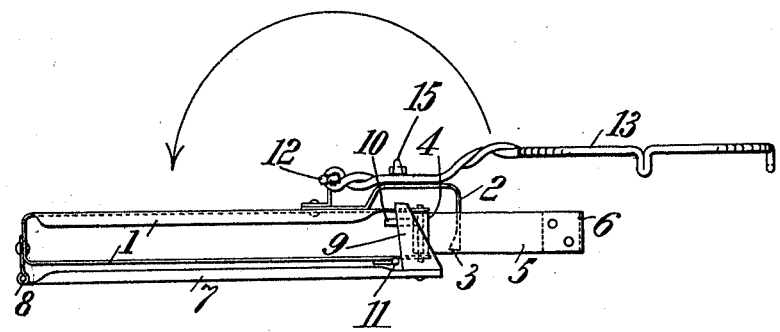
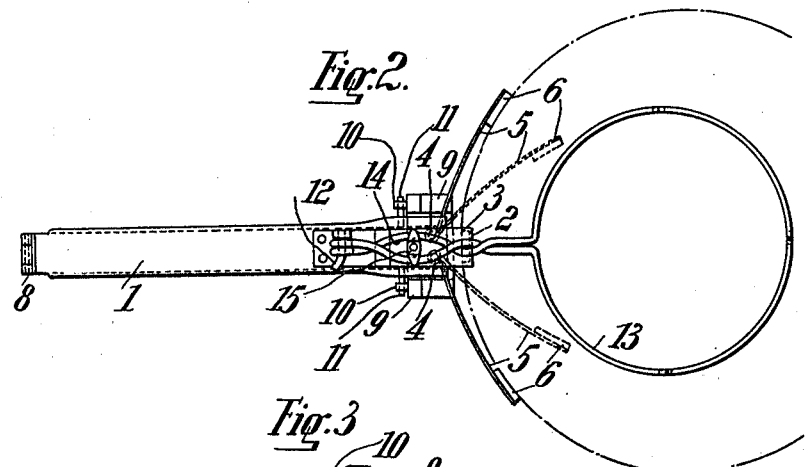
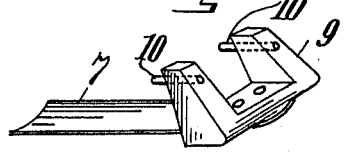
Witnesses:
Inventor:
Franz Schuler.

UNITED STATES PATENT OFFICE.

FRANZ SCHULER, OF CHARLOTTENBURG, GERMANY.

HOLDER FOR COOKING VESSELS.

980,130.  Specification of Letters Patent.  Patented Dec. 27, 1910.

Application filed November 8, 1909. Serial No. 526,886.

*To all whom it may concern:*

Be it known that I, FRANZ SCHULER, a subject of the German Emperor, and resident of 118 Kantstrasse, Charlottenburg, Germany, have invented certain new and useful Improvements in Holders for Cooking Vessels, of which the following is a specification.

My present invention relates to a holder for cooking vessels by means of which I can readily lift and safely hold any cooking vessel. The holder fits any cooking vessel as it is provided with two supporting arms which can be turned toward each other by means of guiding wedges or the like automatically upon the engagement of a cooking vessel. It therefore selfactingly fits cooking vessels of any diameter and safely holds the same.

In the accompanying drawing in which I have illustrated my invention like letters of reference refer to like parts throughout the different views.

Figure 1 shows a side view of my holder for cooking vessels, Fig. 2 shows a plan view, and Fig. 3 shows a perspective view of the guiding wedges.

The holder consists of a handle 1 made of a piece of sheet iron bent into U-shape. Fastened to the upper free end of the handle 1 is a hook 2 the bent end 3 of which is pressed from the inside against the border of the cooking vessel as soon as the hook catches over the vessel. The two parallel arms of the handle 1 are firmly spaced apart at their extremities by pivot pins 4 which carry the movable supporting arms 5. In order to better support the vessel and to prevent the transmitting of heat I preferably attach little wooden blocks 6 to the free ends of said supporting arms said blocks being slanting toward their lower ends. At the rear end of the handle 1 I turnably mount in a pivot pin 8 a bar 7 carrying on its front end guide arms 9 having beveled faces thereon as best shown in Fig. 3.

As soon as the bar 7 is swung against the handle the guiding pins 9 move with their downwardly projecting supporting faces behind the supporting arms 5 and thereby turn the same toward each other. In Fig. 1 I have shown a position of the holder in which the bar 7 is swung against the handle 1 so that the supporting arms 5 are turned toward each other, while in Fig. 2 I show the holder with spreaded supporting arms and swung down bar 7; the dotted circle designates the cooking vessel as it is safely clamped between the hook 2 and the supporting arms 5. The weight of the cooking vessel makes it necessary that the rounded off handle be caught with one or with both hands and strongly pressed.

Behind the wedges I fasten on their upper part pins 10 and below the handle I arrange stops 11 in such a manner that the latter strike against the pins 10 and prevent a too far turning apart of the bar 7 from the handle 1. The supporting arms 5 always rest against the guiding wedges 9.

According to the drawing the holder can be provided with a cover holder 13 which preferably can be mounted on a pivot pin 12 fixed to the handle. In use the cover holder is swung forward upon the hook 2 where it is held by the headed shaft 15 passing through an opening 14, provided in the handle of the cover holder.

The various features of my holder for cooking vessels can of course vary in form and construction. It is for instance practicable to provide the pins 4 with springs or the like continually spreading apart the supporting arms. The motion of the guiding wedges could be accomplished by other means. The pivot pins 4 may be secured to the upper arm of the U-handle and the lower arm may then be omitted entirely, the necessary changes in bar 7 being made to conform to this change. The hook 2 could be bent out of the handle 1 and be one piece with the same. The bar 7 is preferably prolongated above the wedges 9 so that this prolongation supports and vertically adjusts the cooking vessel.

What I claim as new and desire to secure by a United States Letters Patent, is:—

1. A plate or pot lifter consisting of a handle, two supporting arms attached to said handle and turnable toward each other, means for automatically pressing said arms against the cooking vessel upon lifting the same, a hook fixed at front end of said handle for engaging the rim of said vessel between the said supporting arms substantially as described and for the purpose set forth.

2. A plate lifter consisting of a handle, supporting arms attached to said handle and turnable toward each other, a bar attached to said handle, a link connecting said bar and handle, a hook fixed at the front end of said bar, guiding wedges carried by the front end of said bar adapted to engage the supporting arms automatically advancing the same upon manipulating the said holder, substantially as described and for the purpose set forth.

In testimony whereof I have hereunto signed my name this 18th day of September 1909, in the presence of two subscribing witnesses.

FRANZ SCHULER.

Witnesses:
HENRY HASPER,
WOLDEMAR HAUPT.